United States Patent
Ogata et al.

(10) Patent No.: US 7,106,953 B2
(45) Date of Patent: Sep. 12, 2006

(54) AUDIO AND VIDEO RECORDING AND REPRODUCTION APPARATUS

(75) Inventors: Yasuhiro Ogata, Moriguchi (JP); Hiroji Takebayashi, Sanda (JP); Atsushi Hashimoto, Hirakata (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 1168 days.

(21) Appl. No.: 09/887,587

(22) Filed: Jun. 22, 2001

(65) Prior Publication Data

US 2002/0001456 A1 Jan. 3, 2002

(30) Foreign Application Priority Data

Jun. 26, 2000 (JP) ............................. 2000-191934

(51) Int. Cl.
H04N 5/91 (2006.01)
H04N 7/04 (2006.01)

(52) U.S. Cl. ....................................................... 386/96

(58) Field of Classification Search ................. 386/96, 386/46, 125, 104, 105, 106, 107, 117, 83, 386/45, 39
See application file for complete search history.

(56) References Cited

U.S. PATENT DOCUMENTS

| | | | |
|---|---|---|---|
| 5,187,589 A * | 2/1993 | Kono et al. | 386/83 |
| 5,210,618 A * | 5/1993 | De Haan | 386/3 |
| 5,418,620 A * | 5/1995 | Nishino et al. | 386/111 |
| 5,867,229 A | 2/1999 | Stevens | |
| 6,141,490 A | 10/2000 | Oishi et al. | |
| 6,529,681 B1 * | 3/2003 | Ando et al. | 386/95 |

FOREIGN PATENT DOCUMENTS

| | | |
|---|---|---|
| EP | 0 410 626 A1 | 1/1991 |
| EP | 0 673 173 A1 | 9/1995 |
| JP | 05-316459 | 11/1993 |
| JP | 09-330563 | 12/1997 |
| JP | 11-134795 | 5/1999 |
| JP | 11-250583 | 9/1999 |
| KR | 0131705 | 12/1997 |
| WO | 99/31590 | 6/1999 |

OTHER PUBLICATIONS

Korean Office Action dated Dec. 29, 2003 regarding Application No. 5199810650737/052024765.
Japanese Office Action dated Aug. 31, 2004 regarding Application No. 2000-191934.
European Search Report for corresponding Application No. 01114748.5 dated Dec. 15, 2005.

* cited by examiner

Primary Examiner—Robert Chevalier
(74) Attorney, Agent, or Firm—Renner, Otto, Boisselle & Sklar, LLP

(57) ABSTRACT

An audio and video recording and reproduction apparatus of the present invention is an audio and video recording and reproduction apparatus, comprising: an input switching device for switching an input between a first input signal including a first audio and video signal which is input from a first input, a second input signal including a second audio and video signal which is input from a second input, and a third input signal including a third audio and video signal which is input from a third input, and for outputting one of the first signal, the second signal, and the third signal; and a recording device for recording the second input signal and the third input signal on the information recording medium as one recording unit when the input switching device switches the input from the second input signal to the third input signal.

14 Claims, 5 Drawing Sheets

AUDIO AND VIDEO RECORDING AND REPRODUCTION APPARATUS

BACKGROUND OF THE INVENTION

1. Field of the Invention

The present invention relates to an audio and video recording and reproduction apparatus, and in particular to an audio and video recording and reproduction apparatus for converting an audio and video signal to digital data, for separating the digital data into a data file and management information regarding the data file in every recording unit, and recording the data file and the management information on an information recording medium.

2. Description of the Related Art

As used herein, a "recording unit" refers to a unit of audio and video information used in managing audio and video information during reproduction of recorded audio and video information.

An audio and video recording and reproduction apparatus for converting an audio and video signal to digital data, for separating the digital data into a data file and management information regarding the data file in every recording unit, and recording the data file and the management information on an information recording medium has been used.

When this audio and video recording and reproduction apparatus switches an input from a first input to a second input in a recording pause mode, an audio and video signal corresponding to the first input before the switching and an audio and video signal corresponding to the second input after the switching are recorded on an information recording medium as different recording units.

However, when a plurality of line inputs are switched with each other (for example, a camera input and a title input) for editing a program, the conventional audio and video recording and reproduction apparatus causes audio and video signals before and after the switching to be recorded as different recording units. This manner of recording causes inconvenience in managing the edited program.

SUMMARY OF THE INVENTION

According to one aspect of this invention, there is provided an audio and video recording and reproduction apparatus, comprising: an input switching device for switching an input between a first input signal including a first audio and video signal which is input from a first input, a second input signal including a second audio and video signal which is input from a second input, and a third input signal including a third audio and video signal which is input from a third input, and for outputting one of the first input signal, the second input signal, and the third input signal; and a recording device for recording the second input signal and the third input signal on the information recording medium as one recording unit when the input switching device switches the input from the second input signal to the third input signal.

In one embodiment of the invention, the first input includes a tuner input; the second input includes a line input; and the line input includes a first line input to which the second input signal is input and a second line input to which the third input signal is input.

In one embodiment of the invention, the recording device performs: a first recording operation for recording one of the first input signal, the second input signal, and the third input signal; a recording pause operation for allowing the input switching device to switch the input between the first input signal, the second input signal and the third input signal; and a second recording operation performed after the input switching device switches the input between the first input signal, the second input signal and the third input signal.

In one embodiment of the invention, the recording device records the third input signal and the second input signal, which are output from the input switching device, as one recording unit when the input switching device switches the input from the third input signal to the second input signal.

In one embodiment of the invention, the recording device records the first input signal and the second input signal, which are output from the input switching device, as different recording units when the input switching device switches the input from the first input signal to the second input signal.

In one embodiment of the invention, the recording device records the first input signal and the third input signal, which are output from the input switching device, as different recording units when the input switching device switches the input from the first input signal to the third input signal.

In one embodiment of the invention, the recording device records the second input signal and the first input signal, which are output from the input switching device, as different recording units when the input switching device switches the input from the second input signal to the first input signal.

In one embodiment of the invention, the recording device records the third input signal and the first input signal, which are output from the input switching device, as different recording units when the input switching device switches the input from the third input signal to the first input signal.

In one embodiment of the invention, the first input signal includes a fourth input signal and a fifth input signal selected from a multiplexed information signal which is received by a tuner over a radio wave or a wired transmission path; and the recording device records the fourth input signal and the fifth input signal, which are output from the input switching device, as different recording units when the input switching device switches the input from the fourth input signal to the fifth input signal.

In one embodiment of the invention, the recording device converts the first audio and video signal, the second audio and video signal and the third audio and video signal to digital data, separates the digital data into a data file and management information regarding the data file in every recording unit, and records the data file and the management information on the information recording medium.

In one embodiment of the invention, the audio and video recording and reproduction apparatus further comprises a reproduction device for reproducing the data file by reading the data file from the information recording medium based on the management information recorded on the information recording medium.

Thus, the invention described herein makes possible the advantages of providing an audio and video recording and reproduction apparatus which is capable of automatically producing satisfactory program management information.

These and other advantages of the present invention will become apparent to those skilled in the art upon reading and understanding the following detailed description with reference to the accompanying figures.

DESCRIPTION OF THE PREFERRED EMBODIMENTS

Figure 1:
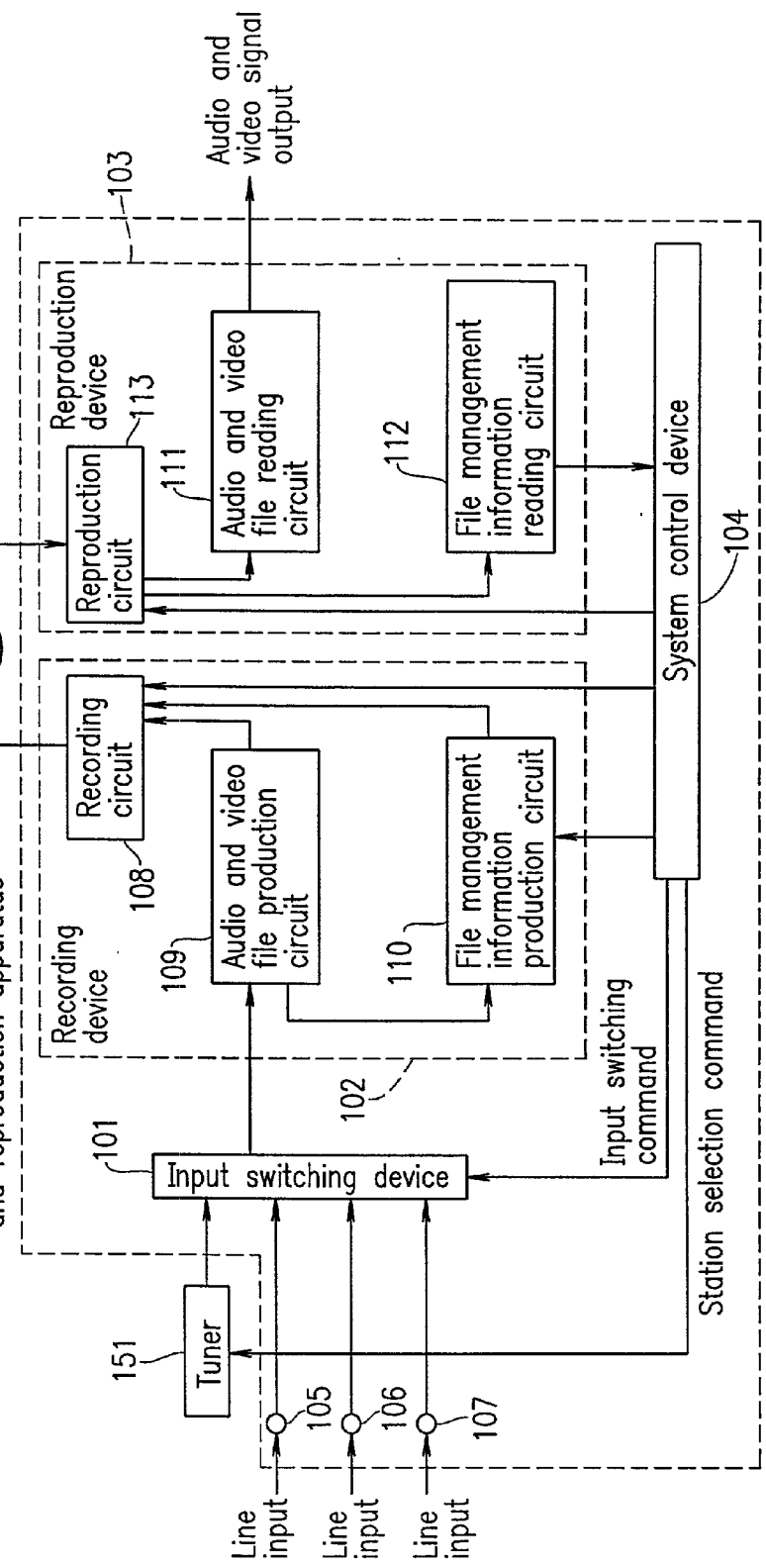
FIG. 1 is a block diagram of an audio and video recording and reproduction apparatus according to one example of the present invention.

FIG. 1 is a block diagram of an audio and video recording and reproduction apparatus 100 according to one example of the present invention. The audio and video recording and reproduction apparatus 100 includes an input switching device 101, a recording device 102, a reproduction device 103, a system control device 104, and line input terminals 105, 106, and 107. The recording device 102 includes a recording circuit 108, an audio and video file production circuit 109, and a file management information production circuit 110. The reproduction device 103 includes a reproduction circuit 113, an audio and video file reading circuit 111, and a file management information reading circuit 112. For simplicity, an analog-to-digital converting circuit included in the audio and video file production circuit 109 and an digital-to-analog converting circuit included in the audio and video file reading circuit 111 are omitted in FIG. 1.

The audio and video recording and reproduction apparatus 100 operates as follows.

A tuner 151 receives a multiplexed information signal over a radio wave or a wired transmission path. The tuner 151 selects a station from a plurality of stations based on a station selection command received from the system control device 104. The input switching device 101 selects either an audio and video signal from the station selected by the tuner 151 or audio and video signals which are input from the line input terminals 105, 106, and 107 based on an input switching command received from the system control device 104, and outputs the selected audio and video signal to the audio and video file production circuit 109.

The audio and video file production circuit 109 performs analog-to-digital conversion of the audio and video signal selected by the input switching device 101 to output a digital audio and video signal. The file management information production circuit 110 produces file management information for managing the digital audio and video signal as a file. The recording circuit 108 records the digital audio and video signal and the file management information produced by the file management production circuit 110 on an information recording medium 152.

The reproduction circuit 113 reads the audio and video signal and the file management information recorded on the information recording medium 152. The audio and video file reading circuit 111 performs digital-to-analog conversion of the audio and video signal read by the reproduction circuit 113 to output an analog audio-digital signal. The file management information reading circuit 112 controls the operation of the audio and video file reading circuit 111 based on the file management information read by the reproduction circuit 113.

Figure 2:
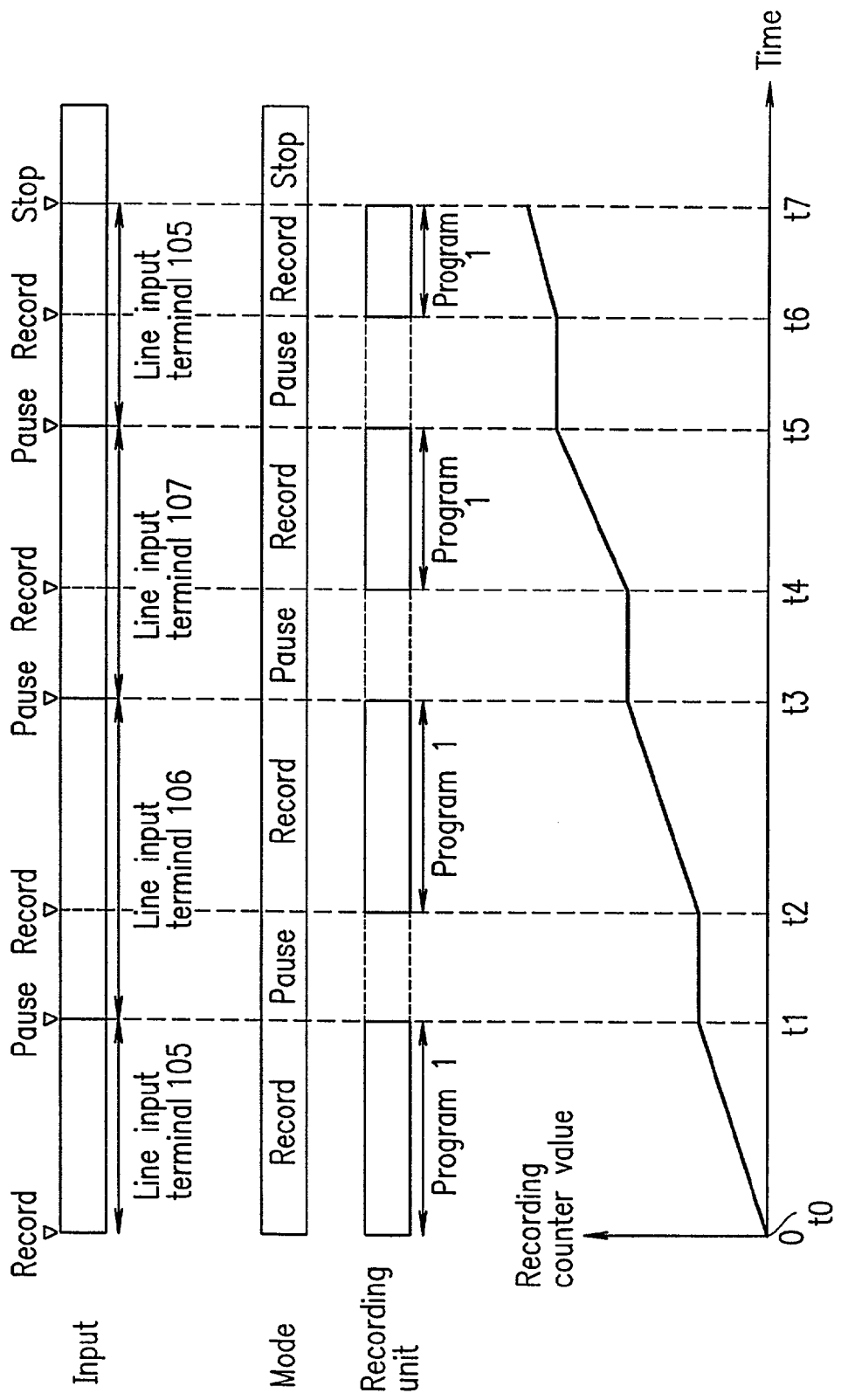
FIG. 2 is a timing diagram illustrating an operation of the audio and video recording and reproduction apparatus shown in FIG. 1.

FIG. 2 is a timing diagram illustrating an operation of the audio and video recording and reproduction apparatus 100 (FIG. 1). In this operation, the input switching device 101 switches the input between the line input terminals 105, 106, and 107, and the line inputs before and after the switching (i.e., the pause period) are recorded on the information recording medium 152 as one recording unit.

At time t0, the input switching device 101 selects the line input terminal 105. The recording device 102 records an audio and video signal which is input from the line input terminal 105 on the information recording medium 152 as a recording unit referred to as program 1. At time t1, the recording device 102 pauses the recording. Then, the input switching device 101 selects the line input terminal 106.

At time t2, the recording device 102 records an audio and video signal which is input from the line input terminal 106 on the information recording medium 152 also as a recording unit referred to as program 1. At time t3, the recording device 102 pauses the recording. Then, the input switching device 101 selects the line input terminal 107.

At time t4, the recording device 102 records an audio and video signal which is input from the line input terminal 107 on the information recording medium 152 also as a recording unit referred to as program 1. At time t5, the recording device 102 pauses the recording. Then, the input switching device 101 selects the line input terminal 105.

At time t6, the recording device 102 records an audio and video signal which is input from the line input terminal 105 on the information recording medium 152 also as a recording unit referred to as program 1. At time t7, the recording device 102 stops the recording.

The audio and video signal which is input from the line input terminal 105, the audio and video signal which is input from the line input terminal 106, and the audio and video signal which is input from the line input terminal 107 are recorded as the same recording unit. Thus, recording counter values are added from the start of the recording (time t0) to the stop of the recording (time t7) except for the pausing periods (from time t1 to time t2, from time t3 to time t4, and from time t5 to time t6).

Figure 3:
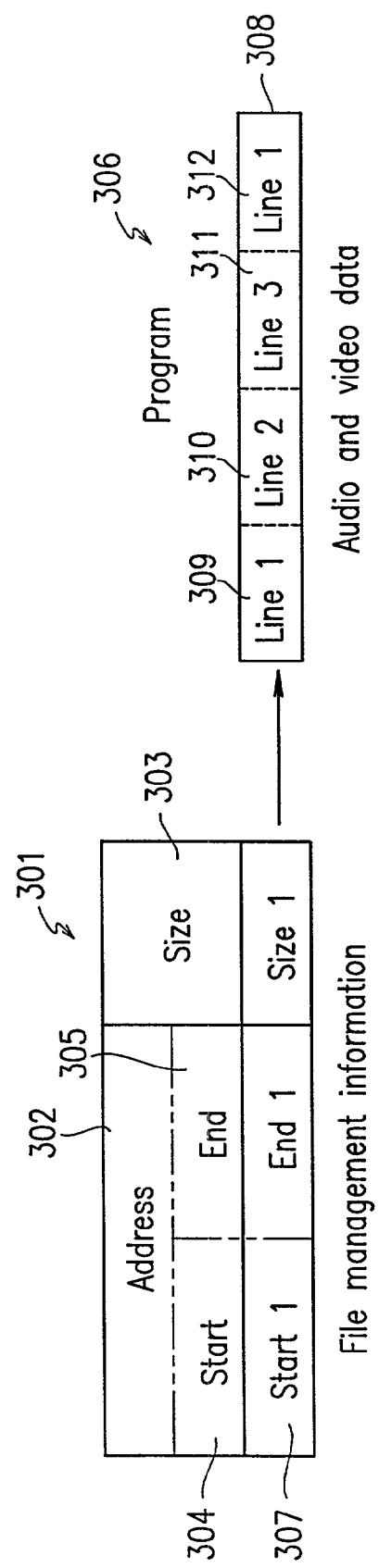
FIG. 3 is a diagram illustrating a logical arrangement of the data recorded on an information recording medium by the audio and video recording and reproduction apparatus shown in FIG. 1.

FIG. 3 is a diagram illustrating a logical arrangement of the data recorded on the information recording medium 152 by the audio and video recording and reproduction apparatus 100. As described with reference to FIG. 2, the audio and video signals before and after the switching are recorded on the information recording medium 152 as one recording unit.

The recorded data includes file management information 301 and audio and video information 306. The file management information 301 includes address information 302 and size information 303. The address information 302 includes start address information 304 and end address information 305.

As described with reference to FIG. 2, the audio and video signals before and after the switching are recorded on the information recording medium 152 as one recording unit when the input switching device 101 switches the input between the line input terminals 105, 106, and 107. Thus, the file management information 301 has a single unit of file management data 307. Also, the audio and video information 306 has a single unit of audio and video data 308. The audio and video data 308 includes an audio and video signal 309 which is input from the line input terminal 105 and recorded from time t0 to time t1, an audio and video signal 310 which is input from the line input terminal 106 and recorded from time t2 to time t3, an audio and video signal 311 which is input from the line input terminal 107 and recorded from time t4 to time t5, and an audio and video signal 312 which is input from the line input terminal 105 and recorded from time t6 to time t7.

When the input switching device 101 switches the input from one of the line input terminals 105 to 107 to another one of the line terminals 105 to 107, the recording device 102 records the audio and video signals before and after the switching on the information recording medium 152 as one recording unit.

Figure 4:
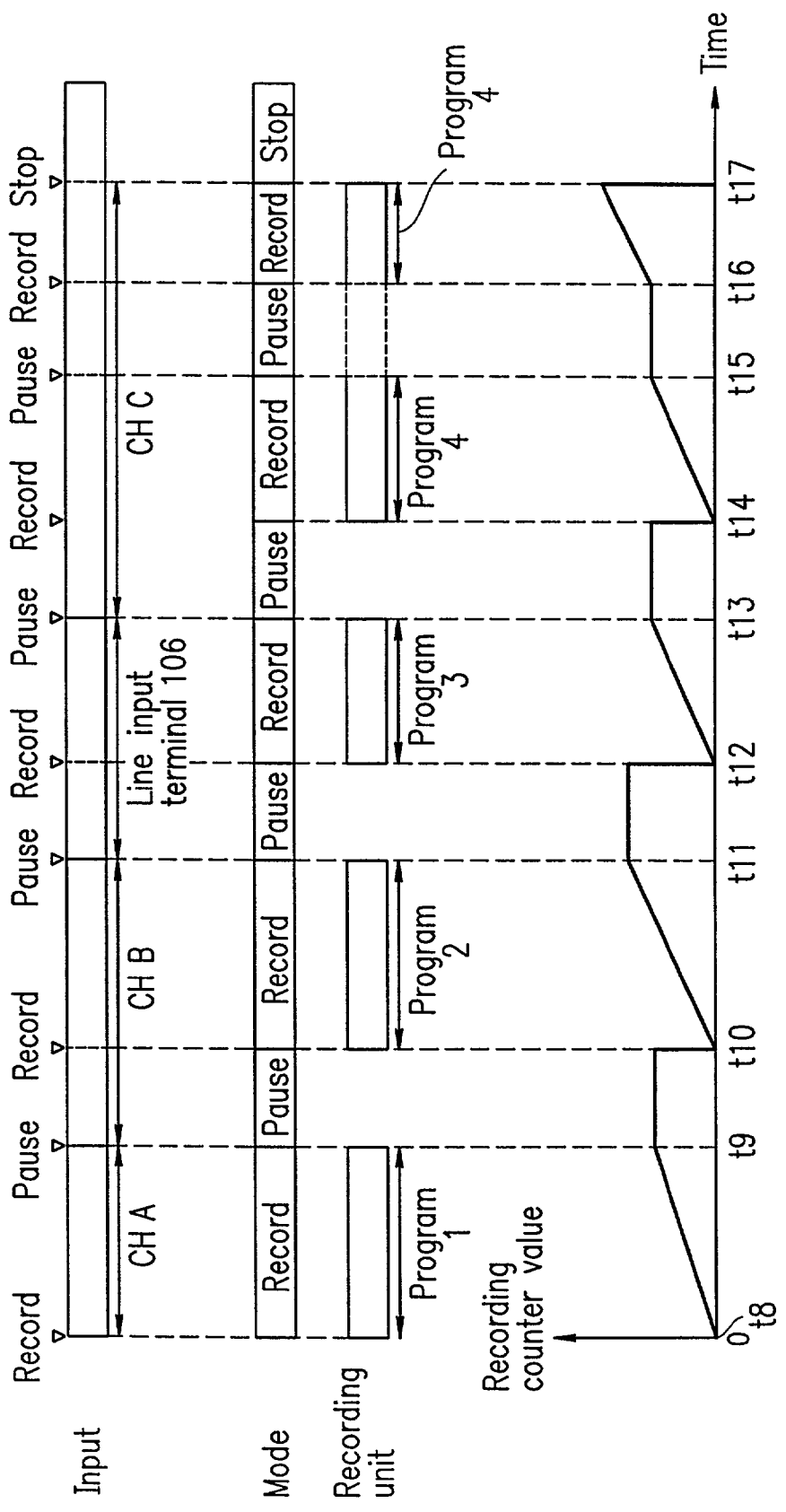
FIG. 4 is a timing diagram illustrating another operation of the audio and video recording and reproduction apparatus shown in FIG. 1.

FIG. 4 is a timing diagram illustrating another operation of the audio and video recording and reproduction apparatus 100. In this operation, the input switching device 101 switches the input between channels selected by the tuner 151, and between one of the line input terminals 105 to 107 and the channel selected by the tuner 151, and the line inputs before and after the switching (i.e., the pause period) are recorded on the information recording medium 152 as different recording units.

At time t8, the input switching device 101 selects channel A selected by the tuner 151. The recording device 102 records an audio and video signal corresponding to channel A on the information recording medium 152 as one recording unit referred to as program 1. At time t9, the recording device 102 pauses the recording. Then, the input switching device 101 selects channel B selected by the tuner 151.

At time t10, the recording device 102 records an audio and video signal corresponding to channel B on the information recording medium 152 as a recording unit referred to as program 2, which is different from program 1. At time t11, the recording device 102 pauses the recording. Then, the input switching device 101 selects the line input terminal 106.

At time t12, the recording device 102 records an audio and video signal which is input from the line input terminal 106 on the information recording medium 152 as a recording unit referred to as program 3, which is different from programs 1 and 2. At time t13, the recording device 102 pauses the recording. Then, the input switching device 101 selects channel C selected by the tuner 151.

At time t14, the recording device 102 records an audio and video signal corresponding to channel C on the information recording medium 152 as a recording unit referred to as program 4, which is different from programs 1 to 3. At time t15, the recording device 102 pauses the recording. At time t16, the recording device 102 records an audio and video signal corresponding to channel C on the information recording medium 152 also as the recording unit referred to as program 4. The audio and video signals are recorded as the same recording unit at time t14 and time t15 because the input switching device 101 does not switch the input between time t14 and time t15. At time t10, time t12, and time t14, the recording counter value is reset because the recording of the audio and video signal as a different recording unit is started.

Figure 5:
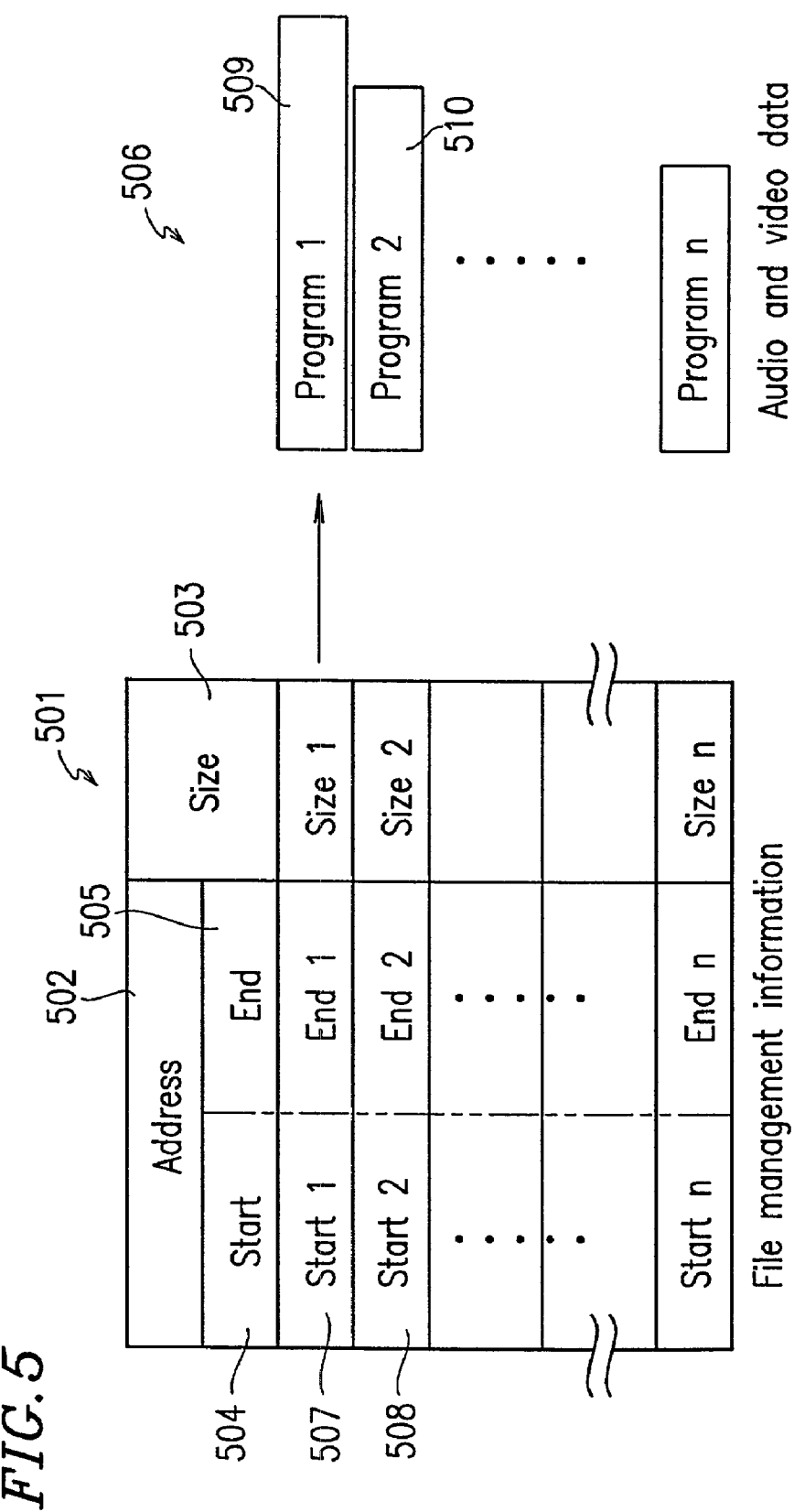
FIG. 5 is a diagram illustrating a logical arrangement of the data recorded on the information recording medium by the audio and video recording and reproduction apparatus shown in FIG. 1.

FIG. 5 is a diagram illustrating another logical arrangement of the data recorded on the information recording medium 152 by the audio and video recording and reproduction apparatus 100. As described with reference to FIG. 4, the audio and video signals before and after the switching are recorded on the information recording medium 152 as different recording units.

The recorded data includes file management information 501 and audio and video information 506. The file management information 501 includes address information 502 and size information 503. The address information 502 includes start address information 504 and end address information 505.

As described with reference to FIG. 4, the audio and video signals before and after the switching are recorded on the information recording medium 152 as different recording units. Thus, the file management information 501 includes a plurality of units of file management data 507, 508, . . . . The audio and video information 506 includes a plurality of units of audio and video data 509, 510, . . . respectively corresponding to the file management data 507, 508, . . . .

When the input switching device 101 switches the input between the channels selected by tuner 151, and between one of the line input terminals 105 to 107 and the channel selected by the tuner 151, the recording device 102 records the audio and video signals before and after the switching as different recording units.

As described above, according to the present invention, a program can be recorded as follows. When a channel is switched to another channel during a pause of recording, the programs before and after the switching are recorded as different recording units. When a line input is switched to another line input during a pause of recording, the audio and video recording and reproduction apparatus is determined to be in an editing mode, and the signals before and after the switching are recorded as the same unit. Therefore, satisfactory program management information can be produced automatically.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An audio and video recording and reproduction apparatus, comprising:

an input switching device for switching an input between a first input signal including a first audio and video signal which is input from a first input, a second input signal including a second audio and video signal which is input from a second input, and a third input signal including a third audio and video signal which is input from a third input, and for outputting one of the first input signal, the second input signal, and the third input signal; and a recording device for recording the second input signal and the third input signal on the information recording medium as one individually indexed recording unit when the input switching device switches the input from the second input signal to the third input signal.

2. An audio and video recording and reproduction apparatus according to claim 1, wherein:

the first input includes a tuner input;

the second input includes a line input; and the line input includes a first line input to which the second input signal is input and a second line input to which the third input signal is input.

3. An audio and video recording and reproduction apparatus according to claim 1, wherein the recording device performs: a first recording operation for recording one of the first input signal, the second input signal, and the third input signal; a recording pause operation for allowing the input switching device to switch the input between the first input signal, the second input signal and the third input signal; and a second recording operation performed after the input switching device switches the input between the first input signal, the second input signal and the third input signal.

4. An audio and video recording and reproduction apparatus according to claim 1, wherein the recording device records the third input signal and the second input signal, which are output from the input switching device, as one recording unit when the input switching device switches the input from the third input signal to the second input signal.

5. An audio and video recording and reproduction apparatus according to claim 1, wherein the recording device records the first input signal and the second input signal, which are output from the input switching device, as different individually indexed recording units when the input switching device switches the input from the first input signal to the second input signal.

6. An audio and video recording and reproduction apparatus according to claim 1, wherein the recording device records the first input signal and the third input signal, which are output from the input switching device, as different recording units when the input switching device switches the input from the first input signal to the third input signal.

7. An audio and video recording and reproduction apparatus according to claim 1, wherein the recording device records the second input signal and the first input signal, which are output from the input switching device, as different recording units when the input switching device switches the input from the second input signal to the first input signal.

8. An audio and video recording and reproduction apparatus according to claim 1, wherein the recording device records the third input signal and the first input signal, which are output from the input switching device, as different recording units when the input switching device switches the input from the third input signal to the first input signal.

9. An audio and video recording and reproduction apparatus according to claim 2, wherein:
the first input signal includes a fourth input signal and a fifth input signal selected from a multiplexed information signal which is received by a tuner over a radio wave or a wired transmission path; and
the recording device records the fourth input signal and the fifth input signal, which are output from the input switching device, as different recording units when the input switching device switches the input from the fourth input signal to the fifth input signal.

10. An audio and video recording and reproduction apparatus according to claim 1, wherein the recording device converts the first audio and video signal, the second audio and video signal and the third audio and video signal to digital data, separates the digital data into a data file and management information regarding the data file in every recording unit, and records the data file and the management information on the information recording medium.

11. An audio and video recording and reproduction apparatus according to claim 10, further comprising a reproduction device for reproducing the data file by reading the data file from the information recording medium based on the management information recorded on the information recording medium.

12. An audio and video recording and reproduction apparatus according to claim 1, wherein the file management information further comprises a start address and an end address of the recorded information.

13. An audio and video recording and reproduction apparatus according to claim 5, wherein the file management information comprises multiple size entries.

14. An audio and video recording and reproduction apparatus according to claim 13, wherein the file management information further comprises multiple start addresses and end addresses of the recorded information.

* * * * *